United States Patent
Eda et al.

(10) Patent No.: US 10,263,838 B2
(45) Date of Patent: Apr. 16, 2019

(54) ASSIGNING RESOURCES TO A WORKLOAD THAT UTILIZES EMBEDDED COMPUTING ENTITIES

(71) Applicant: International Business Machines Corporation, Armonk, NY (US)

(72) Inventors: Sasikanth Eda, Vijayawada (IN); Anbazhagan Mani, Bangalore (IN); Sandeep R. Patil, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/244,466

(22) Filed: Aug. 23, 2016

(65) Prior Publication Data
US 2018/0062916 A1 Mar. 1, 2018

(51) Int. Cl.
*G06F 15/173* (2006.01)
*H04L 12/24* (2006.01)
*H04L 29/08* (2006.01)
*H04L 9/30* (2006.01)

(52) U.S. Cl.
CPC .......... *H04L 41/08* (2013.01); *H04L 41/0896* (2013.01); *H04L 67/1008* (2013.01); *H04L 67/14* (2013.01); *H04L 9/30* (2013.01); *H04L 67/02* (2013.01)

(58) Field of Classification Search
USPC ................................................. 709/223, 226
See application file for complete search history.

(56) References Cited

U.S. PATENT DOCUMENTS

| | | |
|---|---|---|
| 9,135,079 B2 | 9/2015 | Flemming et al. |
| 2007/0220586 A1 | 9/2007 | Salazar et al. |
| 2009/0293022 A1 | 11/2009 | Fries |
| 2012/0316846 A1 | 12/2012 | Cohen et al. |
| 2013/0346615 A1 | 12/2013 | Gondi |
| 2014/0280198 A1 | 9/2014 | Cavage et al. |
| 2014/0310718 A1 | 10/2014 | Gerphagnon et al. |
| 2016/0055024 A1 | 2/2016 | Apte et al. |

OTHER PUBLICATIONS

"The Rings", Openstack, printed May 25, 2016, 7 pages.
(Continued)

*Primary Examiner* — Hee Soo Kim
(74) *Attorney, Agent, or Firm* — Daniel R. Simek (57) ABSTRACT

A method for managing the assignment of computing resources within a networked computing environment. The method includes a computer processor receiving, within the networked computing environment, a workload comprised of a plurality of objects that includes a first set of objects. The method further includes identifying a first embedded computing entity that is associated with the first set of objects. The method further includes deploying an instance of the first embedded computing entity to a first network accessible computing resource. The method further includes copying the first set of objects of the workload from one or more network accessible storage devices to the first network accessible computing resource that includes the deployed instance of the first embedded computing entity. The method further includes processing the workload based, at least in part, on executing the instance of the first embedded computing entity within the first network accessible computing resource.

20 Claims, 4 Drawing Sheets

(56) References Cited

OTHER PUBLICATIONS

"The OpenStack Blog", Everything in & around OpenStack in written words, Merantis Inc., Feb. 15, 2012, 7 pages.
Izsak, et al., "Chapter 11: Data Intensive Enterprise Applications", IGI Global (c) 2013, 7 pages, printed Aug. 3, 2016.
Rabinovici-Cohen, et al., "Storlet Engine: Performing Computations in Cloud Storage", IBM Research Report, Aug. 4, 2014, Computer Science, 12 pages.

ASSIGNING RESOURCES TO A WORKLOAD THAT UTILIZES EMBEDDED COMPUTING ENTITIES

BACKGROUND OF THE INVENTION

The present invention relates generally to the field of data processing, and more particularly to assigning computing resources to various aspects of a workload.

Within various data center, grid computing, networked computing environment, and cloud computing architectures, workloads are comprised of a plurality of data and computing objects distributed among various computing resources of an architecture. Some computing system architectures store information utilizing "object storage." Object storage stores information as objects which include metadata, such as user-defined and/or system-defined tags, which generate "smart" data objects. The metadata of these smart data objects is information rich and can describe, but is not limited to: the content of the data, relationships between the object and other objects, and constraints associated with the object, such as object security.

In an example architecture, object storage can be comprised of various types of entity/node groups. One node group, "proxy nodes," are used for distributing workloads, handling workload requests within a namespace, and directing the transfer of objects that comprise the workload among nodes. A second node group, "storage nodes," are responsible for storing data (e.g., objects), and writing data to disks and/or storage subsystems. A third node group, "computing nodes," are utilized to process and analyze the data within storage nodes to extract meaningful information from the raw data. A workload within an object storage architecture can be initiated by: a user, a software app, such as a time-based batch file or script; a computing system; or a combination thereof. A workload within an object storage architecture can interact with a plurality of nodes prior to producing a result for the workload.

Virtual machines, software containers, executable procedures, and storlets can be included within a storage node to improve performance by reducing the number of computing nodes and associated network activity. Various embedded computing entities include isolation capabilities that enable multiple users to access and share the plurality of data, storage, and computing resources of a networked computing environment.

SUMMARY

According to embodiments of the present invention, there is a method, computer program product, and/or system for managing the assignment of computing resources within a networked computing environment. The method includes at least one computer processor receiving, within a networked computing environment, a workload comprised of a plurality of objects, and the plurality of objects includes a first set of objects. The method further includes identifying a first embedded computing entity that is associated with the first set of objects. The method further includes deploying an instance of the first embedded computing entity to a first network accessible computing resource. The method further includes copying the first set of objects of the workload from one or more network accessible storage devices to the first network accessible computing resource that includes the deployed instance of the first embedded computing entity. The method further includes processing the workload based, at least in part, on executing the instance of the first embedded computing entity within the first network accessible computing resource.

DETAILED DESCRIPTION

Embodiments of the present invention recognize that in object-based storage, various constraints associated with processing a workload may limit performance. Object-based storage can be implemented within: a data center, a grid computing system, a networked computing environment, and/or a cloud computing architecture. A workload generated by a user, an application, and/or another computing system may require access to data distributed among storage systems within a computing architecture. The initial distribution of data can be random, based on various system optimizations and the access of other data by other users and programs. For example, various compute and storage system functions can migrate data within the computing infrastructure based on: a frequency of usage; optimizations for storage devices, such as distributing data based on write-operations for solid-state drives; data storage tiering; etc. In some cases, excessive communication between storage nodes and compute nodes can impair performance. In other cases, performance of nodes can be limited by an inefficient usage of hardware resources. For example, an aspect of a workload can be assigned to a plurality of proxy nodes that process: queries, responses, and compute functions (e.g., statistics, analytics, etc.) transmitted to and received from a plurality of storage nodes. One approach to reducing inefficiencies within a computing infrastructure, such as a networked computing environment, is to include one or more embedded computing entities within a storage node of an object storage environment as opposed to transmitting the data to a compute or proxy node.

Embodiments of the present invention reduce the inefficiencies within an object storage environment by deploying embedded computing entities within storage nodes (e.g., computing resources) based on the hardware and software resources of the storage node and subsequently copying the data that is processed by an embedded computing entity to a corresponding storage node. Embodiments of the present invention can utilize code and/or applications executing within a virtual machine (VM), applications included in a software container, an open-source entity that virtualizes applications, and storlets (e.g., compute engines embedded in object storage) that include executable code, herein identified as embedded computing entities, to analyze and process objects of a workload. An embedded computing entity may be viewed as an analog to stored procedures in databases. Various embedded computing entities can be deployed to a storage node utilizing: templates, VM templates, virtual appliances, image files, etc. For example, a VM may include multiple embedded computing entities and instances of the same embedded computing entity can execute on different computing resources.

Embodiments of the present invention can utilizes embedded computing entities: written by a system administrator, written by a user, purchased (e.g., licensed) from a third-party software developer, and/or created by a computing system that generates a workload. For example, a cognitive system can create embedded computing entities optimized for processing portions of a workload that is created in response to a query by a user. Embodiments of the present invention can integrate the execution of embedded computing entities with one or more other applications that support representational state transfer (REST). In an example, an embodiment of the present invention can respond to a result of an embedded computing entity that identifies audio content within an object that needs further processing by a cognitive program (e.g., a natural language processing (NLP) program). An embodiment of the present invention can spawn a sub-workload that is assigned to a computing resource better suited for NLP.

An embedded computing entity, such as a storlet, may include various characteristics and capabilities. In an example, a storlet may be a computation module that may be uploaded dynamically. For example, the storlet may be transferred to a storage node from another node without interrupting an ongoing process. A storlet can include embedded computing infrastructure within an object storage environment. A storlet can serve to offload data-intensive computations to a computing entity that stores the data as opposed to the data (e.g., objects) being transferred and processed on another computing entity. A storlet may run within a storage unit or medium, proximate to various data. An embodiment of the present invention may run one or more storlets, and may operate along with various software (e.g., middleware). A storlet can consolidate: generic functions, logic, and/or extensive/complex data processing within a computing entity that can be utilized by multiple applications.

Embodiments of the present invention also utilize middleware and/or system functions to determine the computing resources of storage nodes as a basis for deploying the embedded computing entities of a workload among the storage nodes of an object storage environment. Some embodiments of the present invention utilize a user-defined: list, array, template, etc. that identifies data (e.g., objects) of a workload and a corresponding embedded computing entity that processes the identified data. Other embodiments of the present invention parse and analyze a workload to determine relationships between data and embedded computing entities that a user/system can utilize to process data.

One skilled in the art would recognize that by reducing or eliminating the need to transfer data from a storage node to a compute node during the processing of a workload, the overall ability of a computing system to generate results in a meaningful way is increased. As such, the functioning of such a computing system and/or a computing environment is seen to be improved in at least this aspect. In addition, reducing or eliminating the needed to transfer data from a storage node to a compute node during the processing of a workload reduces the wear-and-tear on various portions of the networked computing environment, such as solid-state storage devices.

Another improvement is enhanced security. By placing an embedded computing entity and data that is processed by the embedded computing entity within the same storage node, the exposure to the data across a network is reduced. For example, data is encrypted from an initial storage location to the storage node and only the results derived from processing the data by an embedded computing entity are transmitted to a user. In another example, an embedded computing entity and data processed by the embedded computing entity can be directed to a storage node that includes the hardware and software to ensure the regulatory and/or compliance constraints associated with the data.

Figure 1:
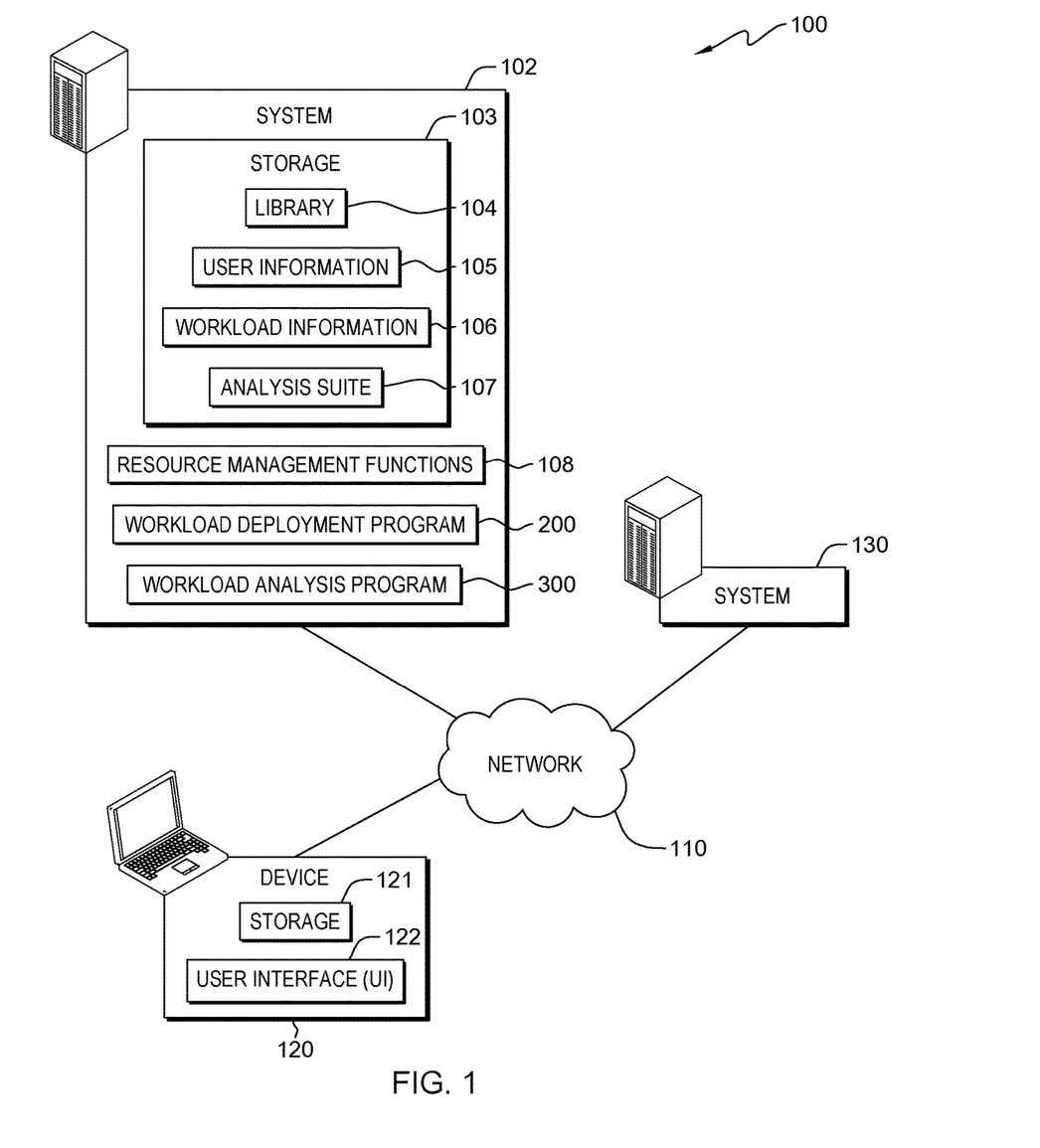
FIG. 1 illustrates a networked computing environment, in accordance with an embodiment of the present invention.

The present invention will now be described in detail with reference to the Figures. FIG. 1 is a functional block diagram illustrating networked computing environment 100, in accordance with embodiments of the present invention. In an embodiment, networked computing environment 100 includes: system 102, device 120, and system 130, all interconnected over network 110. In some embodiments, networked computing environment 100 may include multiple instances of system 130. Many modifications to the depicted environment may be made by those skilled in the art without departing from the scope of the invention as recited by the claims.

System 102, device 120, and system 130 may be: laptop computers, tablet computers, netbook computers, personal computers (PC), desktop computers, personal digital assistants (PDA), smartphones, wearable devices (e.g., digital eyeglasses, smart glasses, smart watches, personal fitness devices, personal safety devices), or any programmable computer systems known in the art. In certain embodiments, system 102 and system 130 represent computer systems utilizing clustered computers and components (e.g., database server computers, application server computers, etc.) that act as a single pool of seamless resources when accessed through network 110, as is common in data centers and with cloud-computing applications. In general, system 102 and system 130 are representative of any programmable electronic device or combination of programmable electronic devices capable of executing machine readable program instructions and communicating with device 120 via network 110. System 102, device 120, and system 130, may include components, as depicted and described in further detail with respect to FIG. 4, in accordance with embodiments of the present invention.

System 102 includes: storage 103, resource management functions 108, workload deployment program 200, workload analysis program 300 and various programs and databases (not shown). Examples of programs and databases of system 102 include: a website interface, a database management system, a multi-path communication program, etc. In various embodiments, system 102 utilizes network 110 to access one or more other computing systems (not shown) that include other programs and/or services utilized to process, analyze, and parse a workload.

Storage 103 includes: library 104, user information 105, workload information 106, and analysis suite 107. Storage 103 may also include various other files, tables, databases, etc. In some embodiments, storage 103 includes one or more persistent storage devices, such as non-volatile memory, solid-state drives (SSDs), hard disk drives (HDDs), and archival media (e.g., tape storage). In various embodiments, storage 103 may include volatile memory that is utilized for in-memory storage and processing of data (e.g., objects).

Library 104 includes: VM templates; VM appliances; executable binary software entities, such as containers; and image files of various computing entities including embedded computing entities, such as storlets. Library 104 includes information associated with the hardware resources that meet the dictates of each embedded computing entity. Library 104 may also include information associated with the minimum functional resource requirements (e.g., hardware) needed to execute an embedded computing entity.

In some embodiments, library 104 also includes monitoring data generated by one or more functions of resource management functions 108. In an example, library 104 includes monitoring data (e.g., performance data) for one or more nodes; one or more storage systems; one or more communication devices; and/or one or more network paths of networked computing environment 100, such as bandwidth, I/O operations per second (TOPS), computational speeds (e.g., Gflops), etc. In an embodiment, library 104 receives, on a temporary basis, a copy of one or more embedded computing entities utilized to process a workload. In an example, library 104 receives copies of one or more embedded computing entities from a user, enabling the user to operate off-line while waiting for the results of a workload that is in a queue within networked computing environment 100.

In various embodiments, library 104 also includes a list of computing and storage entities within and/or accessible by networked computing environment 100. In an example, library 104 includes a list of computing and storage entities (e.g., computing resources) of networked computing environment 100 and the corresponding resources included in a computing resource, such as computer processors (CPUs), graphical processing units (GPUs), field-programmable gate arrays (FPGAs), encryption/decryption hardware, accelerator cards, massively parallel processor arrays (MPPAs), etc.

User information 105 includes: tables, arrays, and databases that are associated with: user accessible (e.g., licensed) embedded computing entities, object types processed by embedded computing entities, algorithms included within embedded computing entities, workload descriptions, etc. User information 105 also includes various user preferences, such as workload priorities, workload costing information (e.g., constraints, over-budget parameters, criterion, etc.), resource allocations/constraints for embedded computing entities, etc. In one example, user information 105 may include a list identifying a range of resources to execute an embedded computing entity. However, the list within user information 105 can include a limit (e.g., throttle) on the amount of computing resources that an embedded computing resource can consume during execution. In another example, user information 105 may include conditions (e.g., primary criteria, secondary criteria, etc.), event hierarchies, optimization schemes, etc. that enable a workload, utilizing the present invention, to access and/or execute one or more additional embedded computing entities of networked computing environment 100 without user intervention.

Workload information 106 includes various elements, such as tables, arrays, and databases that are associated data types (e.g., objects) that are processed by embedded computing entities; algorithms included within an embedded computing entity; storage locations of data; access paths to storage devices/systems; etc. In one embodiment, workload information 106 includes information associated with the algorithms utilized by a workload as opposed to specific embedded computing entities assigned to process an object. In an example, workload information 106 may include generalized information for classifying an object based on an algorithm utilized to process the object. The classification of an object can subsequently be used to identify embedded computing entities that are available (e.g., licensed) to a specific user as opposed to embedded computing entities that are include within system 102 that are available to user or networked computing environment 100. In another embodiment, workload information 106 includes constraints associated with a workload, such as security, regulatory, and/or compliance dictates that affect the transmission and/or storage entities (e.g., computing resources) that receive one or more objects of a workload.

Figure 3:
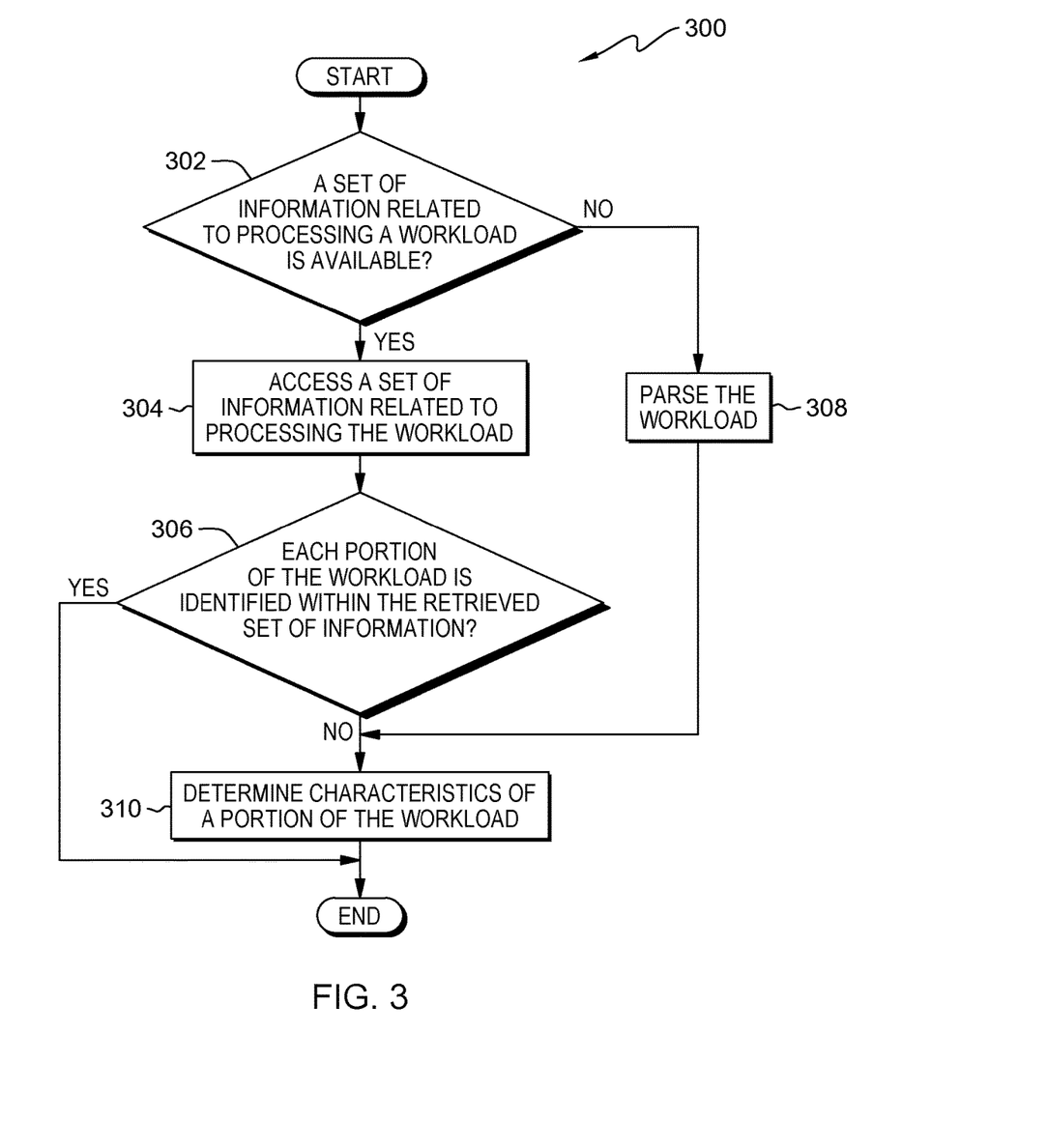
FIG. 3 depicts a flowchart of the operational steps of a workload analysis program, in accordance with an embodiment of the present invention.

In some embodiments, workload information 106 includes historic data associated with previous executions of a workload, such as response times, bandwidth/latency information for portions of network 110, data clustering models, storage partitioning models, etc. In various embodiments, workload information 106 is accessed by workload deployment program 200 to obtain information associated with a workload, such as a list of data (e.g., objects) processed by an embedded computing entity. In one scenario, one or more elements of workload information 106 are updated based on input by a user. In another scenario, one or more elements of workload information 106 are update by an instance of workload analysis program 300.

Analysis suite 107 includes various programs, functions, and applications utilized to parse a workload, process a workload, and/or determine storage locations for data not processed by an embedded computing entity. Analysis suite 107 includes, but is not limited to: analytic functions, clustering functions, graph database analysis tools, graph partitioning programs, visualization programs, etc. In an embodiment, analysis suite 107 includes one or more cognitive functions that can parse and analyze a workload. In some embodiments, users utilizing system 102 have access to one or more elements included in analysis suite 107. In other embodiments, aspects of the present invention can utilize analysis suite 107 and information from library 104 and/or workload information 106 to generate one or more optimization schemes for a workload, such as, but not limited to, a scheme that minimizes a cost to execute the workload, a scheme that minimizes the latency of data transfer for the workload, a scheme that minimizes network activity of the workload, and a high performance optimization scheme that maximizes the performance of the workload. Some optimization schemes may take precedence over the "meets or exceeds" hardware dictates (e.g., criteria) of embedded computing entities and may instead utilize minimum functional requirements or better hardware dictates. Other optimization schemes may focus on high-performance embedded computing entities and/or utilizing high performance computing resources/nodes.

In various embodiments, one or more programs, functions, and applications of analysis suite are purchased (e.g., licensed) as-a-service and are accessible via network 110. In another embodiment, one or more programs, functions, and applications not included within analysis suite are purchased (e.g., licensed) as-a-service and are accessible from another computing system (not shown) that communicates with network 110, such as within a cloud computing environment. In an example, analysis suite 107 includes a visualization program, such as Visual Insights or Concept Insights that enables a user to obtain a visual representation of a workload that includes object placement (e.g., storage locations), embedded computing entity placement, and/or storage location clusterings. In addition, the visualization information can depict: computing resource utilization, network traffic, data processing delays, critical paths/nodes, etc. Such visualization information may enable a user to optimize one or more aspects of a workload.

Resource management functions 108 includes: one or more load balancing programs, a plurality of monitoring functions that monitor the resources and performance of various aspects of networked computing environment 100, one or more tools that monitor the performance of portions (e.g., routers, switches, nodes, communication paths, etc.) of network 110. Resource management functions 108 also includes functions and programs that determine the hardware and software resources of computing and storage entities (e.g., computing resources) within networked computing environment 100. In an example, one or more aspects of resource management functions 108 determine the computing resources, available and/or allocated, of a computing resource (e.g., a node), such a number of CPUs, GBs of volatile memory, GPUs, FPGAs, cryptographic hardware, accelerator cards, MPPAs, etc. In some embodiments, resource management functions 108 includes aspects of a hypervisor (not shown) of system 102.

Figure 2:
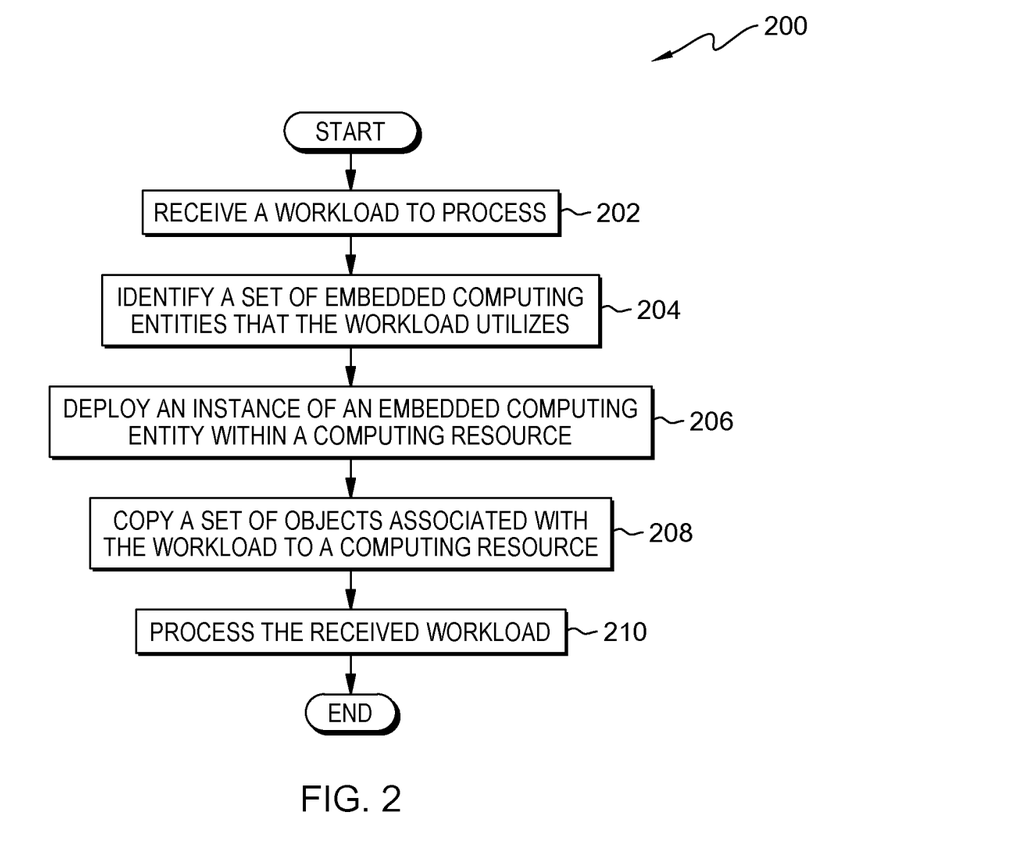
FIG. 2 depicts a flowchart of the operational steps of a workload deployment program, in accordance with an embodiment of the present invention.

Workload deployment program 200 is a program that identifies a set of embedded computing entities that are utilized by a workload. Workload deployment program 200 deploys various instances of embedded computing entities within computing resources (e.g., storage nodes, a blade of a blade-server, a SAN, etc.) of networked computing 100 based on resources of the computing resource and/or constraints and dictates associated with objects of the workload. In response to deploying instances of embedded computing entities among the computing resources of networked computing environment 100, workload deployment program 200 copies objects of the workload to computing resources that include embedded computing entities that process the objects. In some embodiments, workload deployment program 200 identifies various objects of a workload that are not processed by a specific embedded computing entity.

In various embodiments, workload deployment program 200 identifies objects of a workload "on-the-fly." Workload deployment program 200 can classify incoming objects of a workload based on, for example, content, metadata, user specified information, etc. Alternatively, workload deployment program 200 may classify an object based on a generic compute operation (e.g., algorithm) associated with an object, such as encryption, text format conversion, image processing, software compiling, etc. Thereby, workload deployment program 200 may identity specific embedded computing entities that processes the objects as the objects are classified. Subsequently, workload deployment program 200 can deploy instances of the identified embedded computing entities to computing resources (e.g., storage nodes) of networked computing environment 100 prior to copying an incoming object to the appropriate computing resource. "On-the-fly" processing of a workload may not be as efficient as workload deployment program 200 interfacing with workload analysis program 300 to analyze some or all of a workload as opposed to individual objects.

Workload analysis program 300 is a program that analyzes a workload to identify information related to the workload. In one embodiment, workload analysis program 300 accesses a set of information related to processing a workload, such as a list of embedded computing entities utilized to process various portions of the workload. In one scenario, workload analysis program 300 accesses a set of information received with the workload. In another scenario, workload analysis program 300 accesses information related to processing a workload based on information generated by a prior instance of workload analysis program 300 that parsed the workload. For example, workload analysis program 300 accesses workload information 106 to access information associated with a workload. In an alternative embodiment, workload analysis program 300 executes offline to analyze a workload prior to system 102 receiving a request to process the workload. In an example, a user can utilize UI 122 to communicate details of a workload to system 102. Subsequently, the user initiates workload analysis program 300 to analyze the workload. The user may also utilize workload analysis program 300 to develop one or more optimization schemes for the workload.

In another embodiment, workload analysis program 300 parses a workload, to determine the algorithms and related computing entities that can improve the performance of executing the workload. In some embodiments, workload analysis program 300 identifies a portion of a workload that is not associated with an embedded computing entity that processes objects of the workload. Workload analysis program 300 may determine characteristics for an identified portion of a workload that is not associated with an embedded computing entity.

In other embodiments, workload analysis program 300 and workload deployment program 200 execute concurrently and interface to exchange information. In various embodiments, multiple instances of workload analysis program 300 can execute to analyze the workload. In an example, a user submits a query that generates a graph workload that includes various sub-workloads. A first instance of workload analysis program 300 may parse the graph workload and determine that two sub-workloads include information and/or data structures that can utilize embedded computing entities to improve processing of the workload. Workload analysis program 300 initiates two additional instances of workload analysis program 300 to parse each of the determined sub-workloads that can utilize embedded computing entities.

In one embodiment, system 102 communicates through network 110 to device 120, and system 130. Network 110 can be, for example, a local area network (LAN), a telecommunications network, a wireless local area network (WLAN) (e.g., an intranet), a wide area network (WAN), the Internet, or any combination of the previous and can include wired, wireless, or fiber optic connections. In general, network 110 can be any combination of connections and protocols that will support communications between system 102, device 120, and system 130, in accordance with embodiments of the present invention. In some scenarios, system 102 utilizes network 110 to access one or more instances of system 130. In another embodiment, network 110 operates locally via wired, wireless, or optical connections and can be any combination of connections and protocols (e.g., personal area network (PAN), near field communication (NFC), laser, infrared, ultrasonic, etc.).

In some embodiments, a portion of network 110 is representative of a virtual LAN (VLAN) within a larger computing system that includes at least one instance of system 102 and/or at least one instance of system 130. In other embodiments, a portion of network 110 is representative of a virtual private network (VPN) that a user of device 120 can utilize to communicate with system 102 and/or one or more instances of system 130. In a further embodiment, system 102 may utilize a traffic monitoring program (not shown) to monitor a portion of network 110 to identify information and/or metadata that identifies a workload that utilizes one or more embedded computing entities.

System 130 is representative of one or more storage systems within networked computing environment 100. Examples of system 130 include, but are not limited to, network-attached storage (NAS) systems and storage area networks (SANs). In some embodiments, an instance of system 130 is comprised of a combination of physical and virtualized computing resources, such as persistent storage devices, non-volatile memory (e.g., flash memory), volatile memory, CPUs, GPUs, FPGAs, encryption/decryption hardware, etc.

In one embodiment, an instance of system 130 is comprised of a plurality of storage nodes. In another embodiment, an instance of system 130 utilizes a software-defined storage architecture to dynamically create one or more storage nodes. In other embodiments, various instances of system 130 are distributed within a cloud computing environment, such as within a portion of: a public cloud, a private cloud, and a hybrid cloud. Instances of system 130 may be distributed among disparate physical locations.

Device 120 includes: storage 121 and user interface (UI) 122. Storage 121 may include an operating system for device 120 and various programs (not shown), such as a web browser, an e-mail, a database program, an integrated development environment (IDE), and a telecommunication application. One or more programs stored on device 120 and/or one or more programs accessible via network 110 generate workloads that utilizes various aspects of the present invention. In some embodiments, storage 121 includes a local version of user information 105 and/or workload information 106. In various embodiments, storage 121 also includes a list of embedded computing entities accessible (e.g., purchased, licensed, etc.) by a user of device 120, security certificates corresponding to embedded computing entities, and/or the configuration files of one or more embedded computing entities utilized by the user of device 120.

A user of device 120 can interact with UI 122 via a singular interface device, such as a touch screen (e.g., display) that performs both as an input to a graphical user interface (GUI) and as an output device (e.g., a display) presenting a plurality of icons associated with software applications or images depicting the executing software application. Optionally, an app, such as a web browser, can generate UI 122 operating within the GUI of device 120. In some embodiments, device 120 includes various input/output (I/O) devices (not shown), such as a digital camera, a speaker, a digital whiteboard, and/or a microphone.

UI 122 accepts input from a plurality of input/output (I/O) devices including, but not limited to, a tactile sensor interface (e.g., a touch screen, a touchpad), a natural user interface (e.g., a voice control unit, a camera, a motion capture device, eye tracking, etc.), a video display, or another peripheral device. An I/O device interfacing with a UI 122 may be connected to an instance of device 120, which may operate utilizing a wired connection, such as a universal serial bus port (USB™ port) or wireless network communications (e.g., infrared, NFC, etc.). For example, an I/O device may be a peripheral, such as a keyboard, a mouse, a trackball, a click wheel, or a headset that provides input from a user.

In an embodiment, UI 122 may be a graphical user interface (GUI) or a web user interface (WUI). UI 122 can display text, documents, forms, web browser windows, user options, application interfaces, and instructions for operation; and include the information, such as graphics, text, and sounds that a program presents to a user. In some embodiments, a user of device 120 can interact with UI 122 via a singular device, such as a touch screen (e.g., display) that performs both as an input to a GUI/WUI, and as an output device (e.g., a display) presenting a plurality of icons associated with apps and/or images depicting one or more executing software applications. In other embodiments, a software program (e.g., a web browser) can generate UI 122 operating within the GUI environment of device 120. In various embodiments, UI 122 may receive input in response to a user of device 120 utilizing natural language, such as writing words or speaking words, that device 120 identifies as information and/or commands.

In addition, UI 122 may control sequences/actions that the user employs to initiate a workload within networked computing environment 100. In other embodiments, a user of device 120 utilizes UI 122 to: update/modify user information 105, update/modify workload information 106, interface with workload deployment program 200, and/or interface with workload analysis program 300.

FIG. 2 is a flowchart depicting operational steps for workload deployment program 200, a program that includes instances of embedded computing entities, which can be utilized to analyze objects of a workload, within computing resources of networked computing environment 100. Workload deployment program 200 also copies various objects that comprise the workload to computing resources that include one or more instances of embedded computing entities that analyze the related objects, in accordance with an embodiment of the present invention. In some embodiments, workload deployment program 200 interfaces with workload analysis program 300 to retrieve information related to a workload and the embedded computing entities that analyze the processing of the workload. In other embodiments, workload deployment program 200 interfaces with workload analysis program 300 in order to analyze one or more aspects of a workload and/or characterize various portions of the workload.

In step 202, workload deployment program 200 receives a workload to process. In one embodiment, workload deployment program 200 receives a workload based on system 102 acting as an administrative and/or load balancing computing system that distributes workloads among nodes (not shown) of networked computing environment 100. In another embodiment, workload deployment program 200 utilizes one or more functions of system 102 and/or resource management functions 108 to monitor the activity of network 110 and reroute a request to initiate (e.g., process) a workload to system 102. In some embodiments, workload deployment program 200 receives a workload to process based on a daemon or administrative function (not shown) of networked computing environment 100 that identifies information and/or metadata associated with a request to process the workload. In various embodiments, workload deployment program 200 receives a workload to process that is a sub-workload that is include within the executing workload or a sub-workload that is dynamically generated during the execution and processing of the initial workload.

In step 204, workload deployment program 200 identifies a set of embedded computing entities that the workload utilizes. In addition, workload deployment program 200 identifies the computing resources (e.g., physical hardware, virtualized hardware) needed to execute an embedded computing entity. In an example, workload deployment program 200 accesses library 104 to obtain the minimum functional resource dictates and resources that meet the dictates of each embedded computing entity. In one embodiment, workload deployment program 200 identifies a set of embedded computing entities that are utilized by (e.g., facilitate the processing of) the workload based on information received with the workload. In another embodiment, workload deployment program 200 interfaces with workload analysis program 300 to identify a set of embedded computing entities that are utilized by the workload. In one example, workload deployment program 200 utilizes workload analysis program 300 to access workload information 106 to identify a set of embedded computing entities that are utilized by the workload. In some embodiments, workload deployment program 200 directly accesses workload information 106 to identify a set of embedded computing entities that are utilized by the workload. In other embodiments, workload deployment program 200 receives a set of embedded computing entities with the received workload.

In various embodiments, workload deployment program 200 identifies one or more objects of a workload that are not processed by an embedded computing entity. In one scenario, workload deployment program 200 interfaces with workload analysis program 300 to determine characteristics of a portion (e.g., one or more objects) of the workload that is not processed by an embedded computing entity. In another scenario, workload deployment program 200 flags the identified one or more objects that are not processed by an embedded computing entity. In some scenarios, workload deployment program 200 determines that the one or more objects that are not processed by an embedded computing entity are identified as such within the information of the workload.

In step 206, workload deployment program 200 deploys an instance of an embedded computing entity within a computing resource. In one embodiment, workload deployment program 200 deploys an instance (e.g., a copy) of one or more embedded computing entities from a storage location, such as library 104, or a combination of storage locations within networked computing environment 100 to a computing resource. In another embodiment, workload deployment program 200 deploys an instance of one or more embedded computing entities that are included in a set of embedded computing entities received with the workload, to a computing resource.

In some embodiments, workload deployment program 200 deploys an instance of an embedded computing to a computing resource based on physical and/or virtualized resources of a computing resource (e.g., a storage node). Workload deployment program 200 can determine a set of physical and/or virtualized resources associated with each embedded computing entity of the identified set of embedded computing entities. Workload deployment program 200 queries resource management functions 108 to determine which computing resources, such as blade servers, SAN systems, NAS systems, computation nodes, etc. of networked computing environment 100 are available for use and the hardware resources, physical and/or virtualized, associated with each computing resource. In one scenario, workload deployment program 200 assigns an embedded computing entity to a pre-existing computing resource that meets (e.g., has sufficient resources to support the embedded computing entity) or exceeds the dictates of the embedded computing entity, such as including at least one GPU, FPGA, etc. In another scenario, workload deployment program 200 assigns an instance of an embedded computing entity to a pre-existing computing resource that includes a portion of the resource dictates of the embedded computing entity. In various scenarios, workload deployment program 200 submits a request via resource management functions 108 to provision a computing resource within networked computing environment 100 that receives the deployed instance of an embedded computing entity.

In some scenarios, workload deployment program 200 may deploy instances of an embedded computing entity to multiple computing resources within networked computing environment 100. In an example, workload deployment program 200 deploys instances of a text format-conversion embedded computing entity to storage nodes to support the analysis of other embedded computing entities that extract documents from different objects. In other scenarios, workload deployment program 200 may determine such an assignment to a computing resource based on: a percentage match, a threshold of similarity, a hierarchy of resource criteria (e.g., which hardware resource is most needed by an embedded computing entity, minimum functional requirements), etc. In other scenarios, workload deployment program 200 transmits one or more provisioning requests to other computing systems (not shown) within networked computing environment 100 to create a computing resources that supports instances of one or more embedded computing entities.

Still referring to step 206, in another embodiment, workload deployment program 200 may not be able to deploy an instance of an embedded computing entity to a computing resource (e.g., a storage unit) based on a meets or exceed dictate (e.g., criteria) of hardware resources. Security and/or compliance constraints may limit the computing resources that can be selected to receive a deployed instance of an embedded computing entity. In an example, workload deployment program 200 cannot deploy instances of embedded computing entities that process data objects associated with medical records of individuals to computing resources of networked computing environment 100 that are not Health Insurance Portability and Accountability Act (HIPPA) compliant. If workload deployment program 200 identifies one or more computing resources that comply with the HIPPA dictate, then workload deployment program 200 can deploy an instance of the embedded computing entity to a computing resource that includes the minimal functional requirements, or better, of the embedded computing entity that processes the data objects associated with the HIPPA dictate.

In a further embodiment, workload deployment program 200 utilizes historical information associated with processing a workload, information obtained by resource management functions 108, and various aspects of analysis suite 107 to determine the deployment of instances of embedded computing entities within networked computing environment 100. In an example, workload deployment program 200 utilizes analysis suite 107 to execute one or more simulations of a workload to develop a set of assignments for instances of embedded computing entities that optimize the execution of workload as opposed to optimizing the selection of computing resources for each embedded computing entity.

In an alternative embodiment, workload deployment program 200 determines that networked computing environment 100 includes a software-defined storage system (not shown). Workload deployment program 200 interfaces with the software-defined storage system to configure computing resources based on the dictates of the embedded computing entities associated with the received workload.

In step 208, workload deployment program 200 copies a set of objects of the workload to a computing resource that includes a related embedded computing entity. In one embodiment, workload deployment program 200 copies one or more sets of objects (e.g., data) that comprise the received workload to a computing resource that includes a related embedded computing entity. In another embodiment, workload deployment program 200 utilizes information associated with the received workload to identify the current storage locations of the objects that comprise the received workload. In an example, workload deployment program 200 identifies the current storage locations of the objects that comprise the received workload. Workload deployment program 200 transmits a request to copy objects from a current storage location to an assigned computing resource (e.g., a storage node). In some scenarios, workload deployment program 200 may pause in response to a delay in copying data from a storage location, such as a backup tape library, to an assigned computing resource.

In some embodiments, workload deployment program 200 copies one or more sets of objects not processed by an embedded computing entity to a computing resource. In some scenarios, workload deployment program 200 copies one or more objects of a workload that are not processed by a specific embedded computing entity to a storage node based on a user preference and/or dictate such as cost. In other scenarios, workload deployment program 200 copies one or more objects of a workload that are not processed by a specific embedded computing entity to a storage node based on dictates of a load balancer. In a further embodiment, workload deployment program 200 utilizes one or more aspects of analysis suite 107, such as a clustering algorithm to assign objects that do not utilizes embedded computing entities, to storage locations (e.g., storage nodes, storage devices) that reduce the latency of processing objects related storage nodes that utilize embedded computing entities. In an example, workload deployment program 200 assigns an object, such as a table of invariant information, to a storage node that includes an object processed by an embedded computing entity, where the embedded computing entity utilizes the table of invariant information in the processing of the object.

In step 210, workload deployment program 200 processes the received workload. In an embodiment workload deployment program 200 initiates the processing of the received workload. In another embodiment, workload deployment program 200 aggregates the results generated by the embedded computing entities as the results are received for the assigned computing resources. Workload deployment program 200 processes the results based on attributes and/or commands associated with the received workload. In various embodiments, workload deployment program 200 transmits the output of the workload to one or more entities associated with the received workload, such as a user, another workload, another computing system and/or application, or a combination thereof.

FIG. 3 is a flowchart depicting operational steps for workload analysis program 300, a program that obtains information about the embedded computing entities utilized by a workload to process and/or analyze objects that comprise the workload, in accordance with an embodiment of the present invention. In one embodiment, workload analysis program 300 parses and analyzes a workload to determine one or more embedded computing entities that can be utilized to process one or more objects of a workload that can be copied to a computing resource (e.g., a storage node). In another embodiment, workload analysis program 300 accesses a set of information related to processing a workload. In some embodiments, workload analysis program 300 determines characteristics of one or more portions of the workload. In various embodiments, workload analysis program 300 executes offline to analyze a workload prior to the execution of the workload.

In decision step 302, workload analysis program 300 determines whether a set of information related to processing a workload is available. In one embodiment, workload analysis program 300 determines that a set of information related to processing a received workload is available, based on determining that workload information 106 stores information related to the received workload.

In another embodiment, workload analysis program 300 determines that a set of information related to processing a received workload is available, based on receiving the set of information for a workload with the received workload. In one scenario, workload analysis program 300 receives the set of information related to processing a workload from a computing device that initiates the workload, such as device 120. In another scenario, workload analysis program 300 receives the set of information related to processing a workload from a computing device that generates (e.g., compiles) the workload. In an example, a user of device 120 utilizes UI 122 to formulate a natural language query (e.g., a question) that is interpreted, such as by a cognitive function of another computing system (not shown) that communicates with networked computing environment 100. The other computing system generates a workload and identifies one or more embedded computing entities, such as real-time image processing and image recognition software that process objects of the workload. Workload analysis program 300 receives the generated workload and a set of information related to the one or more embedded computing entities utilized to process the generated workload. In addition, the other computing system may also transmit one or more embedded computing entities utilized by the workload with the workload.

Responsive to determining that a set of information related to processing a workload is available (Yes branch, decision step 302), workload analysis program 300 retrieves a set of information of a workload that utilizes a set of embedded computing entities (step 304).

In step 304, workload analysis program 300 accesses a set of information related to processing of the workload. In addition, workload analysis program 300 may access additional information related to a workload that includes the functional resources and/or dictates of one or more embedded computing entities of the workload. In one embodiment, workload analysis program 300 accesses a set of information that identifies one or more embedded computing entities that are utilized to processes the workload. In one example, workload analysis program 300 accesses workload information 106 of system 102 to obtain a set of information related to the embedded computing entities that are utilized to processes the workload. In another example, workload analysis program 300 communicates with a computing system that initiates a workload to obtain information associated with the workload. In another embodiment, workload analysis program 300 accesses a file received with the workload that includes a set of information related to the embedded computing entities that are utilized to processes the workload.

In some embodiments, workload analysis program 300 accesses a set of information related to processing the workload based, at least in part, on other data, such as metadata and/or constraints associated with a workload. In one example, if workload analysis program 300 determines that the received workload is a high priority (e.g., a primary criterion) and not cost constrained, then workload analysis program 300 accesses a set of information (e.g., a processing profile, a configuration file, etc.) that includes high-performance embedded computing entities and/or a high performance optimization scheme. In another example, workload analysis program 300 determines that the received workload is high-priority and utilizes a storlet that includes a limited number of seats (e.g., licenses) for an analytical function; however, workload analysis program 300 determines that no seats are available. Workload analysis program 300 does not delay executing the workload. In response, workload analysis program 300 accesses a set of information that processes the workload and based on user information 105 that identifies an alternative embedded computing entity (e.g., a secondary criterion) that is available within system 102.

In decision step 306, workload analysis program 300 determines whether each portion of the workload is identified within the retrieved set of information associated with the workload. In one embodiment, workload analysis program 300 determines that each portion of a workload is identified within the retrieved set of information based on information associated with the workload that is included in workload information 106. In another embodiment, workload analysis program 300 determines that each portion of the workload is identified based on information included with the workload. In an example, workload analysis program 300 determines that each portion of the workload is identified if each object of a workload is either associated with an embedded computing entity or includes an indication that the object is not processed by an embedded computing entity. In another example, workload analysis program 300 may determine, based on information associated with the workload and within user information 105, that an object not associated with an embedded computing entity is, by default, identified.

Responsive to determining that each portion of the workload is identified within the retrieved set of information (Yes branch, decision step 306), workload analysis program 300 terminates.

Responsive to determining that each portion of the workload is not identified within the retrieved set of information (No branch, decision step 306), workload analysis program 300 determines characteristics of a portion of the workload (step 310).

In step 310, workload analysis program 300 determines characteristics of a portion of the workload. In one embodiment, workload analysis program 300 determines one or more characteristics for a portion (e.g., one or more objects) of a workload that is not identified within the retrieved set of information. In one scenario, workload analysis program 300 determines characteristics and/or constraints associated with an unidentified portion of a workload based on utilizing one or more aspects of analysis suite 107 to identify the nature of the data that is included within the unidentified portion of the workload. In one example, workload analysis program 300 may determine that the portion of the workload that is not identified includes invariant data that can be copied to any computing resource without constraints. In another example, workload analysis program 300 determines that the unidentified portion of the workload includes data that includes one or more security controls, such as RACRD. Workload analysis program 300 accesses one or more security programs (not shown) to determine the constraints associated with the security dictates of this unidentified portion of the workload.

In another embodiment, workload analysis program 300 interfaces with a user of device 120, via UI 122 to determine characteristics of a portion of a workload that is not identified. In an example, workload analysis program 300 presents and/or depicts the workload and one or more portions of the workload that are not identified within the retrieved set of information. Workload analysis program 300 may await a response from the user that assigns one or more characteristics to a portion of the workload that is not identified, such as a characteristic that indicates that the portion does not utilize an embedded computing entity.

In some scenarios, workload analysis program 300 receives an indication from a user to initiate one or more aspects of analysis suite 107 to enable the user to determine one or more characteristics of the portion of the workload that is not identified. In one example, a user may request via UI 122 that workload analysis program 300 initiates a visualization program and a spectral clustering program so that the user can see how aspects of the workload are related and subsequently determine one or more characteristics for a portion (e.g., one or more objects) of the workload that is not identified. One such characteristic may be that multiple instances of an invariant object may be distributed among storage locations of the workload as opposed to copying a single instance of the invariant object to a central storage location; thereby reducing network traffic to access the invariant object.

Referring to decision step 302, responsive to determining that a set of information related to processing a workload in not available (No branch, decision step 302), workload analysis program 300 parses the workload (step 308).

In step 308, workload analysis program 300 parses the workload. In one embodiment, workload analysis program 300 parses the workload to identify the plurality of objects that are included in the workload. In one example, workload analysis program 300 parses a workload to identify the plurality of objects that are included in the workload by utilizing one or more functions or programs of analysis suite 107, such as a graph database analysis program. In another example, workload analysis program 300 parses the workload to identify the plurality of objects based on content and/or metadata associated with an object. In one scenario, workload analysis program 300 may save a copy of a parsed workload to workload information 106. In another scenario, workload analysis program 300 transmits a copy of a parsed workload to a computing system, such as device 120, which submitted the workload. In some embodiments, workload analysis program 300 parses the workload to identify various constraints and/or interactions among objects of the workload, such as security constraints or that the workload includes/generates other workloads (e.g., sub-workloads).

In another embodiment, workload analysis program 300 parses a workload to determine information associated with the algorithms that are utilized to process the one or more objects of the workload. In one scenario, workload analysis program 300 identifies embedded computing entities that include the algorithms utilized to process the objects of the workload. In another scenario, workload analysis program 300 identifies an embedded computing entity based on a classification associated with an object of the workload. In various embodiments, workload analysis program 300 analyzes, via one or more aspects of analysis suite 107, the results of various parsing methods and information within user information 105 to determine the structure of the workload and which portions (e.g., one or more objects) of the workload utilize embedded computing entities.

In step 310, workload analysis program 300 determines characteristics of a portion of the workload. Workload analysis program 300 may include (e.g., store) the determined characteristics for portions of a workload within information associated with the workload. For example, workload analysis program 300 may include determined characteristics for portions of a workload within: user information 105, workload information 106, and/or a transmission for local storage within storage 121 of device 120. In one embodiment, workload analysis program 300 determines characteristics for a portion of a parsed workload. In one scenario, workload analysis program 300 determines the size of related objects that are included in a portion of a workload. In another scenario, workload analysis program 300 determines a portion of the workload that includes security constraints. In some scenarios, workload analysis program 300 determines characteristics associated with a portion of a workload, such as rates of I/O operations and/or an encryption protocol of an object. In other scenarios, workload analysis program 300 determines characteristics of a portion of the workload, such as the classifications and/or algorithms utilized by the objects of the portions of the workload.

In another embodiment, workload analysis program 300 determines characteristics of a portion of the workload, such as one or more embedded computing entities related to the processing the objects included in the portion of the workload. In some embodiments, workload analysis program 300 determines characteristics of a portion of the workload, such as object clustering and/or clustering of embedded computing entities. In other embodiments, workload analysis program 300 determines characteristics of a portion of the workload based on one or more user preferences, such as cost, an optimization scheme, licensed embedded computing entities, or a combination thereof. In one scenario, workload analysis program 300 obtains user preferences from user information 105. In another scenario, workload analysis program 300 receives one or more user preferences included within the information of the workload. In some scenarios, workload analysis program 300 obtains user preferences from a combination of sources.

In a further embodiment, workload analysis program 300 utilizes one or more visualization programs to depict, via UI 122, the parsing and analysis of one or more portions of the workload to a user that initiated the workload. In an example, workload analysis program 300 presents a representation of the workload, based on one or more aspects of analysis suite 107, to a user that generates the workload. Workload analysis program 300 may receive: one or more characteristics of a portion of the workload, modifications of characteristics of a portion of the workload, and/or modification of the analysis of the workload. Alternatively, workload analysis program 300 may receive a request from a user for further analysis and/or optimizations of a portion of the workload.

Figure 4:
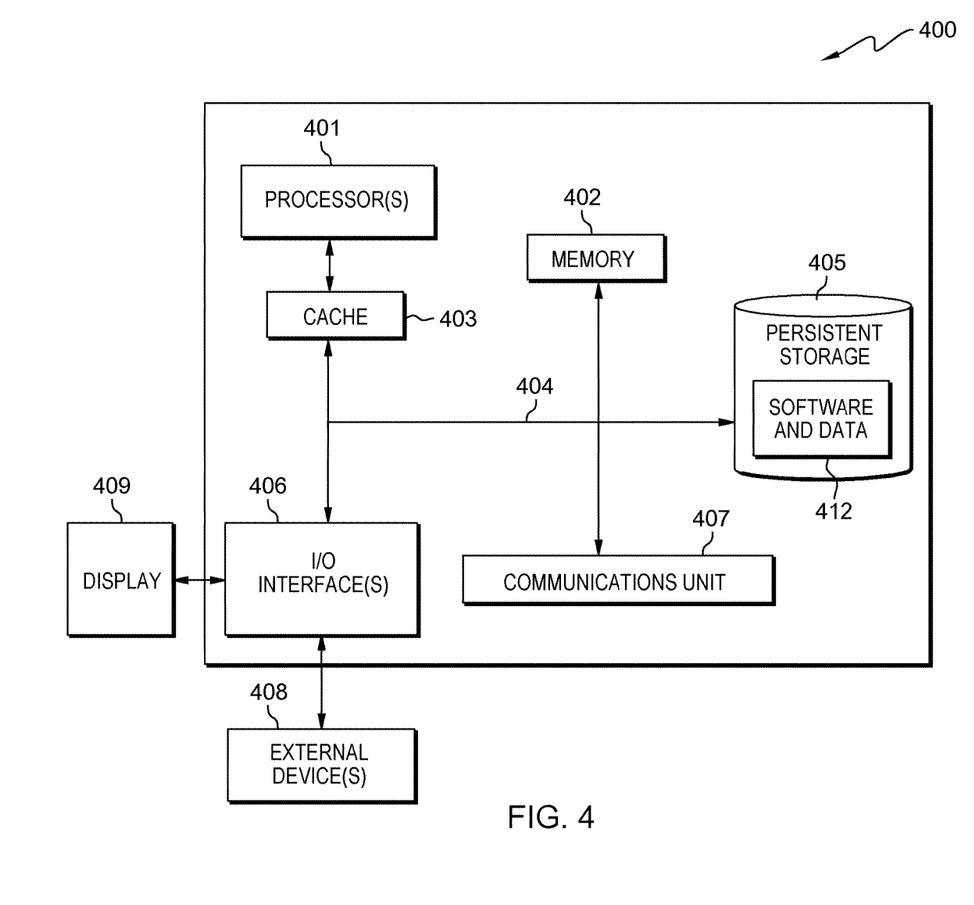
FIG. 4 is a block diagram of components of a computer, in accordance with an embodiment of the present invention.

FIG. 4 depicts computer system 400, which is representative of system 102, device 120, and system 130. Computer system 400 is an example of a system that includes software and data 412. Computer system 400 includes processor(s) 401, memory 402, cache 403, persistent storage 405, communications unit 407, I/O interface(s) 406, and communications fabric 404. Communications fabric 404 provides communications between memory 402, cache 403, persistent storage 405, communications unit 407, and I/O interface(s) 406.

Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. With respect to system 102 persistent storage 405 includes storage 103. With respect to device 120 persistent storage 405 includes storage 121. With respect to system 130 persistent storage 405 includes a plurality of storage devices.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes library 104, user information 105, workload information 106, analysis suite 107, resource management functions 108, workload deployment program 200, workload analysis program 300, and various information, programs and databases (not shown). With respect to device 120, software and data 412 includes UI 122, and various information, such as a local instance of user information 105 and a local instance of workload information 106, and programs (not shown).

Communications unit 407, in these examples, provides for communications with other data processing systems or devices, including resources of system 102, device 120, and system 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing an assignment of computing resources within a networked computing environment, the method comprising:
    receiving, by one or more computer processors, within a networked computing environment, a workload comprised of a plurality of objects, wherein the plurality of objects includes a first set of objects;
    identifying, by one or more computer processors, a first embedded computing entity that is associated with the first set of objects;
    deploying, by one or more computer processors, an instance of the first embedded computing entity to a first network accessible computing resource;
    copying, by one or more computer processors, the first set of objects of the workload from one or more network accessible storage devices to the first network accessible computing resource that includes the deployed instance of the first embedded computing entity; and
    processing, by one or more computer processors, the workload based, at least in part, on executing the instance of the first embedded computing entity within the first network accessible computing resource.

2. The method of claim 1, wherein the networked computing environment includes an object storage environment and a plurality of network accessible computing resources.

3. The method of claim 1, wherein an embedded computing entity includes one or more data processing algorithms.

4. The method of claim 1, wherein deploying the instance of the first embedded computing entity to the first network accessible computing resource further comprises:
    identifying, by one or more computer processors, a first set of hardware resources that are dictated by an embedded computing entity;
    determining, by one or more computer processors, a plurality of sets of hardware resources that correspond to a set of network accessible computing resources of the networked computing environment, wherein the set of network accessible computing resources includes the first network accessible computing resource;
    determining, by one or more computer processors, that the first network accessible computing resource includes a second set of hardware resources that meets or exceeds the first set of hardware resources dictated by the first embedded computing entity; and
    in response to determining that the first network accessible computing resource includes the second set of hardware resources that meets or exceeds the first set of hardware resources dictated by the first embedded computing entity, deploying, by one or more computer processors, an instance of the first embedded computing entity to the first network accessible computing resource that includes the second set of hardware resources.

5. The method of claim 1, further comprising:
    identifying, by one or more computer processors, a second embedded computing entity that is associated with a second set of objects, wherein the second set of objects is included in the plurality of objects;
    determining, by one or more computer processors, that the second set of objects includes a security constraint;
    identifying, by one or more computer processors, a second network accessible computing resource of the networked computing environment that complies with the security constraint of the second set of objects; and
    in response to identifying the second network accessible computing resource of the networked computing environment that complies with the security constraint of the second set of objects, deploying, by one or more computer processors, an instance of the second embedded computing entity to the second network accessible computing resource of the networked computing environment.

6. The method of claim 1, wherein deploying the instance of the first embedded computing entity to the first network accessible computing resource further comprises:
    identifying, by one or more computer processors, an optimization scheme associated with the workload;
    determining, by one or more computer processors, a plurality of sets of hardware resources that correspond to a set of network accessible computing resources of the networked computing environment; and
    identifying, by one or more computer processors, a network accessible computing resource within the set of network accessible computing resources is based on (i) a primary criteria of one or more constraints of the workload and the identified optimization scheme, and (ii) a secondary criteria of the set of hardware resources dictated by an embedded computing entity associated with a set of objects.

7. The method of claim 6, wherein the optimization scheme is selected from the group consisting of: an optimization to minimizing a cost to execute the workload, a first scheme that minimizes a cost to execute the workload, a second scheme that minimizes a latency of data transfer for the workload, and a third scheme that maximizes a performance of the workload.

8. The method of claim 6, wherein the set of hardware resources dictated by the embedded computing entity utilized by the workload is based on a minimum functionality dictate of the embedded computing entity.

9. A computer program product for managing an assignment of computing resources within a networked computing environment, the computer program product comprising:
    one or more non-transitory computer readable storage media and program instructions stored on the one or more non-transitory computer readable storage media, the program instructions readable/executable by one or more computer processors:
    program instructions to receive within a networked computing environment, a workload comprised of a plurality of objects, wherein the plurality of objects includes a first set of objects;
    program instructions to identify a first embedded computing entity that is associated with the first set of objects; program instructions to deploy an instance of the first embedded computing entity to a first network accessible computing resource;
    program instructions to copy the first set of objects of the workload from one or more network accessible storage devices to the first network accessible computing resource that includes the deployed instance of the first embedded computing entity; and program instructions to process the workload based, at least in part, on executing the instance of the first embedded computing entity within the first network accessible computing resource.

10. The computer program product of claim 9, wherein the networked computing environment includes an object storage environment and a plurality of network accessible computing resources.

11. The computer program product of claim 9, wherein program instructions to deploy the instance of the first embedded computing entity to the first network accessible computing resource further comprises:
   program instruction to identify a first set of hardware resources that are dictated by an embedded computing entity;
   program instruction to determine a plurality of sets of hardware resources that correspond to a set of network accessible computing resources of the networked computing environment, wherein the set of network accessible computing resources includes the first network accessible computing resource;
   program instruction to determine that the first network accessible computing resource includes a second set of hardware resources that meets or exceeds the first set of hardware resources dictated by the first embedded computing entity; and
   program instruction to respond to determining that the first network accessible computing resource includes the second set of hardware resources that meets or exceeds the first set of hardware resources dictated by the first embedded computing entity by deploying an instance of the first embedded computing entity to the first network accessible computing resource that includes the second set of hardware resources.

12. The computer program product of claim 9, further comprising:
   program instruction to identify a second embedded computing entity that is associated with a second set of objects, wherein the second set of objects is included in the plurality of objects;
   program instruction to determine that the second set of objects includes a security constraint;
   program instruction to identify a second network accessible computing resource of the networked computing environment that complies with the security constraint of the second set of objects; and
   program instruction to respond to identifying the second network accessible computing resource of the networked computing environment that complies with the security constraint of the second set of objects by deploying an instance of the second embedded computing entity to the second network accessible computing resource of the networked computing environment.

13. The computer program product of claim 9, wherein program instructions to deploy the instance of the first embedded computing entity to the first network accessible computing resource further comprises:
   program instruction to identify an optimization scheme associated with the workload;
   program instructions to determine a plurality of sets of hardware resources that correspond to a set of network accessible computing resources of the networked computing environment; and
   program instructions to identify a network accessible computing resource within the set of network accessible computing resources is based on (i) a primary criteria of one or more constraints of the workload and the identified optimization scheme, and (ii) a secondary criteria of the set of hardware resources dictated by an embedded computing entity associated with a set of objects.

14. The computer program product of claim 13, wherein the optimization scheme is selected from the group consisting of: an optimization to minimizing a cost to execute the workload, a first scheme that minimizes a cost to execute the workload, a second scheme that minimizes a latency of data transfer for the workload, and a third scheme that maximizes a performance of the workload.

15. The computer program product of claim 13, wherein the set of hardware resources dictated by the embedded computing entity utilized by the workload is based on a minimum functionality dictate of the embedded computing entity.

16. A computer system for managing an assignment of computing resources within a networked computing environment, the computer system comprising:
   one or more computer processors;
   one or more non-transitory computer readable storage media; and
   program instructions stored on the non-transitory computer readable storage media for execution by at least one of the one or more computer processors, the program instructions comprising:
      program instructions to receive within a networked computing environment, a workload comprised of a plurality of objects, wherein the plurality of objects includes a first set of objects;
      program instructions to identify a first embedded computing entity that is associated with the first set of objects;
      program instructions to deploy an instance of the first embedded computing entity to a first network accessible computing resource;
      program instructions to copy the first set of objects of the workload from one or more network accessible storage devices to the first network accessible computing resource that includes the deployed instance of the first embedded computing entity; and
      program instructions to process the workload based, at least in part, on executing the instance of the first embedded computing entity within the first network accessible computing resource.

17. The computer system of claim 16, wherein the networked computing environment includes an object storage environment and a plurality of network accessible computing resources.

18. The computer system of claim 16, wherein program instructions to deploy the instance of the first embedded computing entity to the first network accessible computing resource further comprises:
   program instruction to identify a first set of hardware resources that are dictated by an embedded computing entity;
   program instruction to determine a plurality of sets of hardware resources that correspond to a set of network accessible computing resources of the networked computing environment, wherein the set of network accessible computing resources includes the first network accessible computing resource;
   program instruction to determine that the first network accessible computing resource includes a second set of hardware resources that meets or exceeds the first set of hardware resources dictated by the first embedded computing entity; and program instruction to respond to determining that the first network accessible computing resource includes the second set of hardware resources that meets or exceeds the first set of hardware resources dictated by the first embedded computing entity by deploying an instance of the first embedded computing entity to the first network accessible computing resource that includes the second set of hardware resources.

19. The computer system of claim 16, further comprising:
program instruction to identify a second embedded computing entity that is associated with a second set of objects, wherein the second set of objects is included in the plurality of objects;
program instruction to determine that the second set of objects includes a security constraint;
program instruction to identify a second network accessible computing resource of the networked computing environment that complies with the security constraint of the second set of objects; and
program instruction to respond to identifying the second network accessible computing resource of the networked computing environment that complies with the security constraint of the second set of objects by deploying an instance of the second embedded computing entity to the second network accessible computing resource of the networked computing environment.

20. The computer system of claim 16, wherein program instructions to deploy the instance of the first embedded computing entity to the first network accessible computing resource further comprises:
program instruction to identify an optimization scheme associated with the workload;
program instructions to determine a plurality of sets of hardware resources that correspond to a set of network accessible computing resources of the networked computing environment; and
program instructions to identify a network accessible computing resource within the set of network accessible computing resources is based on (i) a primary criteria of one or more constraints of the workload and the identified optimization scheme, and (ii) a secondary criteria of the set of hardware resources dictated by an embedded computing entity associated with a set of objects.

* * * * *